(12) United States Patent
Verma et al.

(10) Patent No.: US 8,447,876 B2
(45) Date of Patent: May 21, 2013

(54) CONTENT TIMING METHOD AND SYSTEM

(75) Inventors: Snigdha Verma, Somerset, NJ (US);
Jun Li, Plainsboro, NJ (US); Junbiao Zhang, Bridgewater, NJ (US)

(73) Assignee: Thomson Licensing, Boulogne-Billacourt (FR)

( * ) Notice: Subject to any disclaimer, the term of this patent is extended or adjusted under 35 U.S.C. 154(b) by 732 days.

(21) Appl. No.: 11/920,656

(22) PCT Filed: Jun. 2, 2005

(86) PCT No.: PCT/US2005/019330
§ 371 (c)(1),
(2), (4) Date: Nov. 19, 2007

(87) PCT Pub. No.: WO2006/132611
PCT Pub. Date: Dec. 14, 2006

(65) Prior Publication Data
US 2009/0132640 A1 May 21, 2009

(51) Int. Cl.
*G06F 15/16* (2006.01)
(52) U.S. Cl.
USPC ............ 709/232; 709/203; 709/215; 709/245
(58) Field of Classification Search .................. 709/231, 709/232
See application file for complete search history.

(56) References Cited

U.S. PATENT DOCUMENTS

| | | | |
|---|---|---|---|
| 6,026,369 A * | 2/2000 | Capek ......................... | 705/14.54 |
| 6,108,703 A | 8/2000 | Leighton et al. | |
| 6,122,657 A * | 9/2000 | Hoffman et al. ............. | 709/201 |
| 6,138,162 A * | 10/2000 | Pistriotto et al. .............. | 709/229 |
| 6,185,598 B1 * | 2/2001 | Farber et al. .................. | 709/200 |
| 6,405,240 B1 | 6/2002 | Tsubone | |
| 6,415,327 B1 * | 7/2002 | Beckerman et al. .......... | 709/231 |
| 6,418,453 B1 * | 7/2002 | Kraft et al. ............................ | 1/1 |
| 6,434,621 B1 * | 8/2002 | Pezzillo et al. ............... | 709/231 |
| 6,445,822 B1 * | 9/2002 | Crill et al. ..................... | 382/218 |
| 6,453,339 B1 * | 9/2002 | Schultz et al. ................ | 709/206 |

(Continued)

FOREIGN PATENT DOCUMENTS

| | | |
|---|---|---|
| JP | 200057072 | 2/2000 |
| JP | 200249766 | 2/2002 |

(Continued)

OTHER PUBLICATIONS

Manikandan, S. et al. "A Framework for Minimizing Latency in CDN Using URL Request Routing Approach," Academic Open Internet Journal, vol. 16, 2005.*

(Continued)

*Primary Examiner* — Lynn Feild
*Assistant Examiner* — Melvin H Pollack
(74) *Attorney, Agent, or Firm* — Robert D. Shedd

(57) ABSTRACT

A computer method and related apparatus for delivering content files to a client computer are disclosed wherein a request for a content file on a content server is received from a client; a future time period during which the content file will be available on a cache server is determined; and a rewritten uniform resource locator comprising time period availability information, or a link to a file comprising the time period availability information, is returned from the server to the client. The client can use the information to obtain the content file in the determined future time period.

25 Claims, 2 Drawing Sheets

U.S. PATENT DOCUMENTS

| | | | |
|---|---|---|---|
| 6,460,050 B1* | 10/2002 | Pace et al. | 1/1 |
| 6,778,808 B1* | 8/2004 | Shimazu | 455/3.03 |
| 6,804,717 B1* | 10/2004 | Bakshi et al. | 709/225 |
| 7,085,848 B2* | 8/2006 | Cabrera et al. | 709/232 |
| 7,159,233 B2* | 1/2007 | Son et al. | 725/86 |
| 7,181,523 B2* | 2/2007 | Sim | 709/226 |
| 7,185,063 B1* | 2/2007 | Kasriel et al. | 709/216 |
| 7,299,290 B2* | 11/2007 | Karpoff | 709/231 |
| 7,305,475 B2* | 12/2007 | Tock | 709/227 |
| 7,386,627 B1* | 6/2008 | Lango et al. | 709/236 |
| 7,415,607 B2* | 8/2008 | Sinn | 713/158 |
| 7,421,659 B2* | 9/2008 | Estrada et al. | 715/751 |
| 7,483,883 B2* | 1/2009 | Barth et al. | 1/1 |
| 7,574,481 B2* | 8/2009 | Moore et al. | 709/217 |
| 7,664,864 B2* | 2/2010 | Ball et al. | 709/229 |
| 7,725,435 B1* | 5/2010 | Li et al. | 707/626 |
| 7,752,325 B1* | 7/2010 | Yadav et al. | 709/231 |
| 7,774,331 B2* | 8/2010 | Barth et al. | 707/706 |
| 7,779,068 B2* | 8/2010 | Li et al. | 709/203 |
| 7,783,777 B1* | 8/2010 | Pabla et al. | 709/238 |
| 7,823,208 B2* | 10/2010 | DeMello et al. | 726/26 |
| 7,966,414 B2* | 6/2011 | Cinghita et al. | 709/231 |
| 7,991,905 B1* | 8/2011 | Roussos et al. | 709/231 |
| 8,204,999 B2* | 6/2012 | Crosbie et al. | 709/229 |
| 2002/0016162 A1 | 2/2002 | Yoshihara | |
| 2002/0026512 A1* | 2/2002 | Nishimura et al. | 709/226 |
| 2003/0065739 A1* | 4/2003 | Shnier | 709/217 |
| 2003/0204694 A1* | 10/2003 | Degenaro et al. | 711/164 |
| 2004/0034830 A1* | 2/2004 | Fuchs et al. | 715/501.1 |
| 2004/0054777 A1* | 3/2004 | Ackaouy et al. | 709/225 |
| 2004/0117437 A1* | 6/2004 | Frank | 709/203 |
| 2004/0215733 A1* | 10/2004 | Gondhalekar et al. | 709/207 |

FOREIGN PATENT DOCUMENTS

| | | |
|---|---|---|
| JP | 2003114838 | 4/2003 |
| WO | WO0208856 | 1/2002 |
| WO | WO03034704 | 4/2003 |

OTHER PUBLICATIONS

Cahill, Adrin and Sreenan, Cormac. "An Efficient CDN Placement Algorithm for the Delivery of High-Quality TV Content," Proceedings of the 12th Annual ACM Intl Conference on Multimedia, 2004, pp. 975-976.*

Lu, Jian. "An Architecture for Delivering Broadband Video over the Internet," Proceedings of the International Conference on Information Technology: Coding and Computing, Apr. 10, 2002, pp. 542-547.*

Hayashi, T. et al. "IGAP: Secure Group Management Protocol for Multicast Content Delivering Network," The 2004 Joint Conference of the 10th Asia-Pacific Conference on Communications and the 5th International Symposium on Multi-Dimensional Mobile Communications Proceedings, vol. 2, Sep. 1, 2004, pp. 626-630.*

Almeroth, K. C. et al.: "The Interactive Multimedia Jukebox (IMJ): a new paradigm for the on-demand delivery of audio/video" Computer Networks and ISDN Systems, vol. 30, No. 1-7, Apr. 1998, pp. 431-441, XP004121404.

International Search Report, dated Jan. 23, 2006.

* cited by examiner

CONTENT TIMING METHOD AND SYSTEM

This application claims the benefit, under 35 U.S.C. §365 of International Application PCT/US2005/019330, filed Jun. 2, 2005, which was published in accordance with PCT Article 21(2) on Dec. 14, 2006, in English.

BACKGROUND ART

This invention relates to the field of data communications and especially to methods and systems for delivering content files efficiently. The invention relates in particular to methods and systems for requesting, storing, and delivering large and very large content files from a remote content provider to a content file client device such as a laptop computer using a browser, a personal data assistant, or a cell phone.

Multimedia digital information files such as audio, video, movies, and the like are relatively large as compared to most other types of files which are downloaded via the Internet. Frequently a request is made from a client computer to a content provider web site and the large file is not immediately available due to network congestion, too much current traffic, prioritizations, and capacity limitations.

Among the previously proposed and used methods and systems for delivering content in general to client computers are content delivery networks which include content brokers and edge servers, which are a form of cache servers located in strategic geographic locations. Content delivery networks can cache content in cache servers, known in such networks as edge servers because they are located at strategic geographic locations near the edge of the network, from which content can be available to client computers even in cases of network congestion and outage.

Various techniques are described in an Akamai Networks, Inc. White Paper entitled *Internet Bottlenecks: the Case for Edge Delivery Services*, and a Network Working Group Internet Draft of Apr. 3, 2003 entitled *Known CN Request-Routing Mechanisms*, Barbir, et al.

Content delivery networks are also described in U.S. Patent Publications 20030065762 of Apr. 3, 2003; 20030002484 of Jan. 2, 2003; and Leighton et al, U.S. Pat. No. 6,108,703. The method of tagging content for delivery from the content delivery network using a migratory and a rewrite tool which rewrites URLs to point to the edge server most likely to host the requested content is disclosed in these publications and patent.

Other content delivery type networks for television broadcasting, live performances, music juke boxes, global networks and data delivery systems are described in the following references: International Publication No. WO 03/034704 published Apr. 24, 2003; U.S. Patent Publication No. 2002/0026512; "*The Interactive Multimedia Jukebox (IMJ): a new paradigm for the on-demand delivery of audio/video*", Kevin C. Almeroth, Mostafa H. Ammar, Computer Networks and ISDN Systems 30 (1998) 431-441, 1998; U.S. Pat. No. 6,108,703; and International Publication No. WO 02/08856 published Jan. 31, 2002.

Prior content delivery networks distribute content based on past, i.e., historical, information. Obtaining content availability information from content delivery-networks, a content provider can redirect a content uniform resource locator (URL) to an edge server that is closer to the requesting client in order to speed up) the downloading of the content file to the client. The content provider may fail to redirect a content URL to an edge server closer to requesting client because the content is not currently available on any of those edge servers. In some cases a user will be willing to tolerate delays in delivery of large content files such as multimedia files for a variety of reasons, for example the user may not need to use the file immediately or may be requesting the file from a personal data assistant or web-enabled cellular phone and may wish to have the file streamed at a future time because of time constraint or may not be able to use the file because of capacity constraint of the requesting device.

In a downloading service model, for example, a content request does not necessarily reflect that there is an immediate need for the content. Therefore, even if a piece of content is currently not available on an edge server, if the content delivery network can deliver the content to the edge server at a future time, the content provider can satisfy the need of a user by redirecting the request to the edge server.

While present content delivery networks improve the delivery of content files to client computers, as content files become larger and use of the Internet to request and obtain multimedia files becomes more prevalent, further improvements to content delivery systems and methods are needed to provide a satisfactory delivery rates.

BRIEF SUMMARY OF THE INVENTION

The present invention addresses the aforementioned needs by providing a method delivering content files to a client computer comprising receiving a request for a content file from a client; determining a future time period during which the content file will be available on a cache server; and delivering time based information on content availability.

In another aspect, the invention comprises a system for delivering content files to a client computer comprising a content server and at least one cache server adapted to: (a) receive a request for a content file from a client, (b) determine a future time period during which the file will be available for delivery from the content server or a cache server, and (c) to return time-based information comprising the time period availability information.

By way of example, the time-based information can comprise a URL rewritten according to methods generally known in this art, for example by a content broker which receives information from the cache servers in a content delivery network as to traffic, availability of particular files and various locations, and then returns the re-written URL to the content server which received the request from the client. The rewritten URL contains time period information or a link to a file comprising time period availability information, and preferably also comprises or points to information regarding the content server or cache server on which the content will be available during the time period. In place of a re-written URL, the time information could also comprise one of a CGI script or an active X program.

The present invention enables extending request routing capability to cache servers, which can hold content at a future time period. For example, Akamai's request routing technique is to replace the original URL (e.g. http://contentURL) with an "Akamai-ed" URL (e.g. http://local_cache_server/contentURL) that redirects to a local cache server in the content delivery network. In accordance with an aspect of the invention, an "Akamai-ed" URL is a link that will be available during a future time period.

The client computer can be any general purpose or special purpose computer such as a desktop, laptop, personal data assistant, web-enabled cellular phone, or any other Internet Protocol enabled machine, usually of the type, which is running any Mosaic-based web browser such as Internet Explorer, or Netscape. The client usually has plug-ins, a term well known in this art for additional programs which carry out separate functions.

By use of URLs or other comparable mechanisms, the client computer can open web pages and request content files to be transferred or downloaded. The web pages and content files are initially stored at a content server, which runs a web site, but may also be stored in various edge servers in a content delivery network, which comprises a broker, to communicate with content servers. Base on the location and delay tolerance of the request from the client computer, a content server can provide a redirected URL comprising a time period of availability of the corresponding content. The delay tolerance can be, for example, "no later than 6 PM" or "best effort," for example.

As is conventional with content delivery networks, the content files are stored in a content server computer and copies of the content files are delivered from time to time to one or more edge servers, and wherein upon receipt of a request for a content file, the server either delivers the content file to the client, redirects the request to an edge server which has a copy of the requested content file by sending to the requesting client a rewritten URL. In accordance with an aspect of the invention, the rewritten URL comprises the timing availability information, or a link to a file comprising the time period availability information.

The content server and/or the content delivery network determine the future availability information. In one embodiment, the content server communicates with the content delivery network through a broker.

The request from the client for a file can comprise delay tolerance information, which can be generated at the client level by any of several methods, for example, standard preferences may be indicated in a web browser, or the client indicates at the content server web site with a desired delivery time or a desired delivery time period.

The rewritten URL returned to the client may comprise a special string as indicating the time period availability information, or the URL itself is a link to a file comprising the redirected URL and the time period availability information, for example, the file contains XML tags comprising the time period so that an XML parser can read the XML tag and enable or disable the URL during the appropriate time periods.

The revised URL can also link to a program on a content server or a cache server, which can transfer, i.e., push or stream, the requested content file during the time period or at a certain time.

Alternatively, as mentioned, the client may have a plug-in or other programming to process the revised URL and request transfer of the content file during the period of availability.

The content delivery network, which typically comprises at least one edge server and broker(s) to communicate with the content server(s), can schedule the distribution of content files to edge servers and return a corresponding URL with availability time period information to content server through a broker.

DETAILED DESCRIPTION

Figure 1:
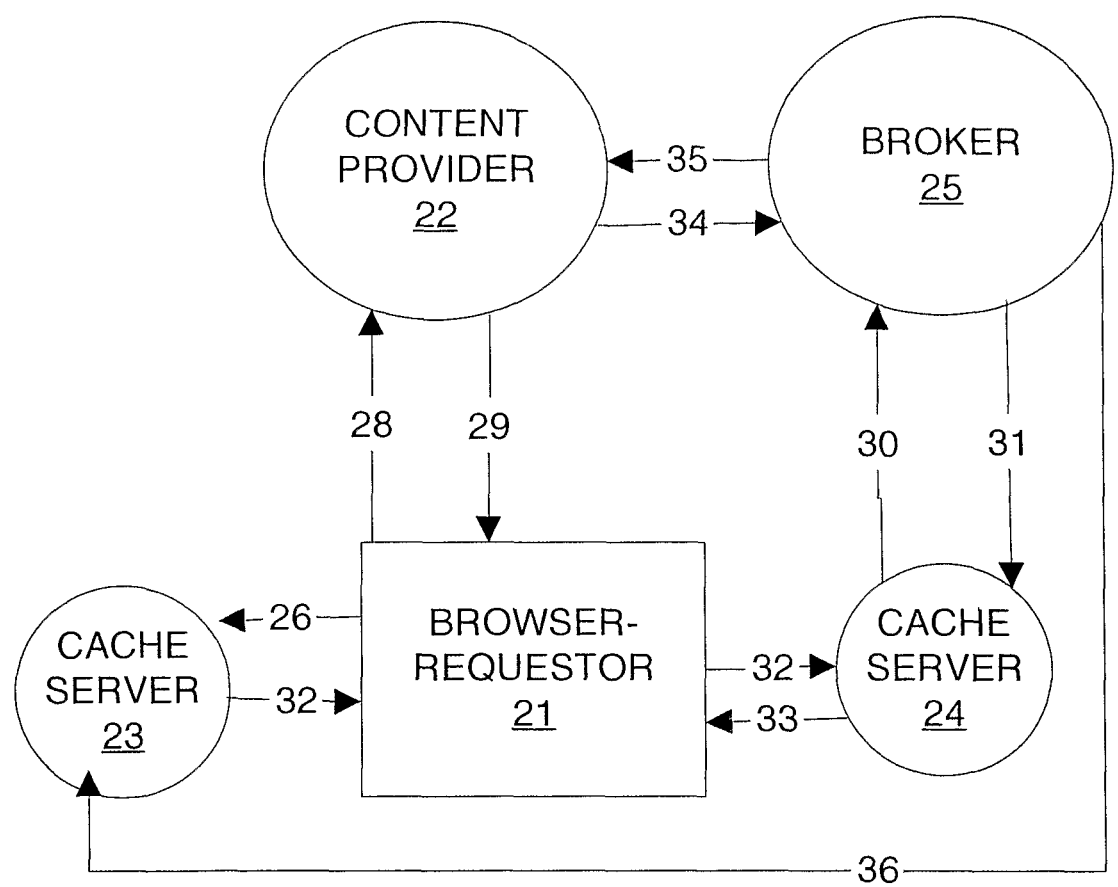
FIG. 1 is a schematic of an embodiment of a system of the invention.

FIG. 1 depicts a content delivery network in accordance with the present principles. The network includes a client that runs a browser 21. The browser 21 operates to request a content file, for example the movie entitled "Matrix Reloaded," by sending a URL 28 to a content provider 22, Movies-Inc.Com in this example. Movies-Inc.Com content provider 22 web site has a business relationship with the content delivery network to speed up the delivery of movie files, which are relatively large to its customers, such as client 21. Movies-Inc.Com content provider 22 sends a request 34 for information to a content delivery network broker 25, which manages at least one, and preferably, a set of cache servers, exemplified by cache server 23 and cache server 24. The broker 25 sends availability inquiries 31 and 36 to the cache servers 23 and 24, respectively, to find out whether they currently store the requested movie file. Various movie files are transferred from time to time from the content provider 22 to cache servers 23 and 24 via the broker 25.

The broker 25 provides content current and/or future availability information to Movies-Inc.Com content provider 22 where the content file URLs are prepended (Akamai-ed) for redirecting to cache servers. Additionally, information on the time periods when the content files will be available at corresponding cache servers is also added. Upon receiving a content request from the client 21, the Movies-Inc.Com content provider 22 can also dynamically request the broker 25 for a content file delivery to a location close to the client. Based on the capacity of network links and cache servers, a content delivery schedule can be made by the content delivery network and the content file availability can be returned to the Movies-Inc.Com content provider 22 through the broker 25.

A prepended URL directed to cache server 23 can be redirected to cache server 24 if the cache server 23 determines that the cache server 24 is closer to the client and the content file is available during a time period satisfying the client.

The rewritten URL may contain timing information in some of the following formats: (a) XML tags, (b) parameters of a cache server, or (c) client dynamic programs, respectively, as illustrated in the following three examples.

Example 1

XML Tags

In this case, the URL link is enabled according to timing tags. For example:

```
<Content timing>
<Period start=18:00, 9/10/03, end=19:00>
<a href=http://location1/contentURL> contentURL </a>
</Period>
<Period start=19:00, 9/10/03, end=20:00>
<a href=http://location2/contentURL> contentURL </a>
</Period>
</Content timing>
```

An XML parser can interpret these tags and can enable/disable the link during different time periods. The XML parser may use, for example, a different color or shade for a disabled link and show available time period when the mouse is on it, for example.

Example 2

Server Program Parameter

In this example, the URL link points to a CGI or other type of server program on the original or local server, with parameters of both URL and time period. For example: http://contentTiming.cgi?URL=contentURL?period_start=1800?period_end=1900). If the current time does not fall in the given time period, the CGI program will do nothing but return to current page. Otherwise, opening a returned URL (e.g. http://local_cache_server/contentURL) serves to accomplish content downloading.

Similar to the XML example, this one requires the browser understand special strings in the parameter field of the URL. The browser can disable the URL when current time is out of the range.

Example 3

Client Plug-In

In this method, the URL link is pointing to a file with a special extension; for example, .tim (http://contentURL.tim). In the file "contentURL.tim", the original and local URL and timing information can be available in a format that is readable by the plug-in program. This solution has the most flexibility. The plug-in program can run in background to get the content at a future time without any interaction.

Content timing is a useful tool to extend existing content delivery network (content delivery network) technologies to work for downloading services. In a downloading service model, the locations and the devices of the content consumer and the content requester can be different, which is known as the triangle model with respect to traditional server/client model.

The three examples alluded to earlier can be used for both the server/client model and the triangle model as long as the URL link can be viewed by the client.

The future information of a content availability depends on the scheduler of content distribution in a content delivery network. Scheduling content to be made available at the cache server is a separable problem from our current methods of indicating time availability of the content.

Figure 2:
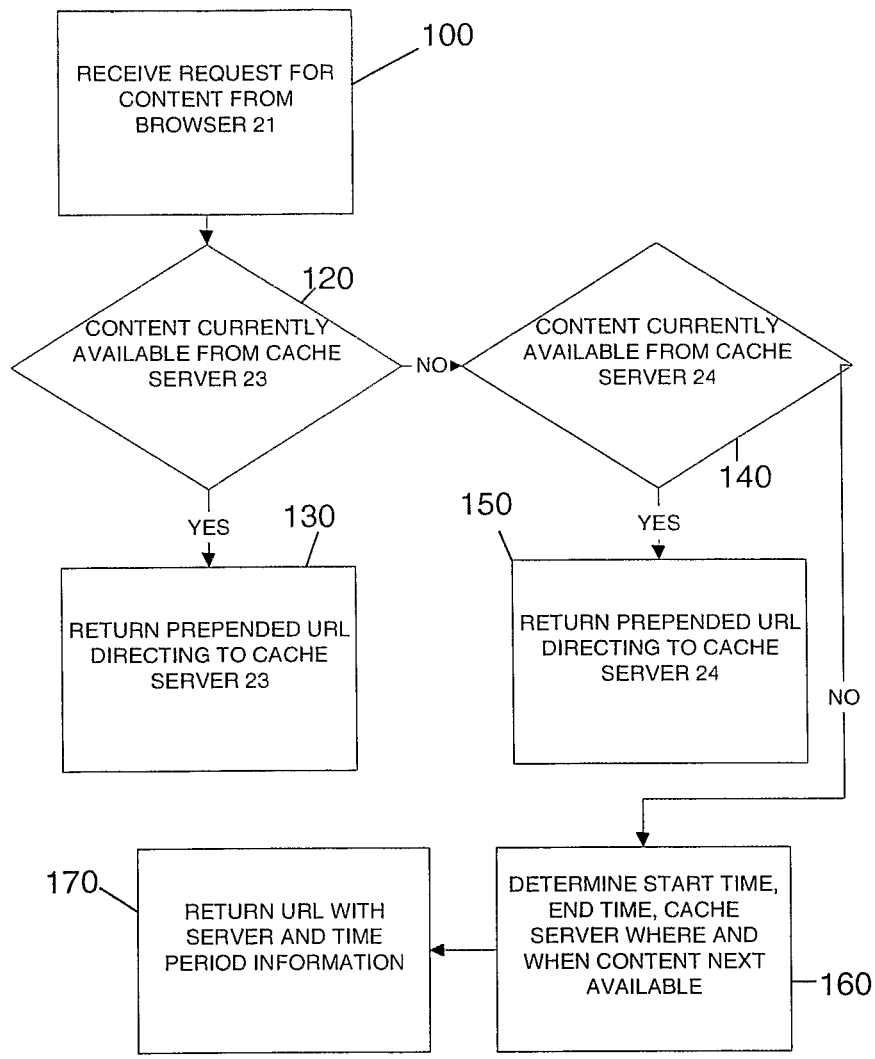
FIG. 2 is a flow chart of one embodiment of the invention.

FIG. 2 depicts a flow chart illustrating the steps undertaken by the content delivery network of FIG. 1 to schedule content delivery in accordance with the present principles. The method commences upon receipt of a request for content from a client using the browser 21 of FIG. 1 during step 100 of FIG. 2. A check occurs at the request-routing functional entity (RRFE) during step 120, based on the location of the client, regarding whether the content is currently available on a cache server (e.g., cache server 23) closest to the client. If so, a prepended URL redirecting to cache server 23 of FIG. 1 is returned to the client by the RRFE during step 130 of FIG. 2. If the content isn't available from the cache server 23 following the check made during step 120, a check occurs at the RRFE during step 140 of FIG. 2 to determine if the requested content file is scheduled to be available on another cache server close to the client, e.g., cache server 24 of FIG. 1. If so, a prepended URL with a future availability [T1, T2], redirecting to the cache server 24 of FIG. 1 is returned by the RRFE during step 150 of FIG. 2. When the client receives the prepended URL, it requests the content file from the appropriate cache server when the content is available.

If the content file is not immediately available and there is no scheduled availability on any of the cache server close to the client, the content server 22 will negotiate with the content delivery network (CDN) through the broker 25 in order to determine the start time, end time, and the cache server where the content file will next be available during step 160 of FIG. 2 and return a URL redirecting to such cache server with the time period information during step 170. The client will process the URL and wait until the time period to request the file from the appropriate cache server.

The scope of the invention is defined by the appended claims.

The invention claimed is:

1. A method for delivering content files comprising:
receiving a request for a content file from a client, said request including client delay tolerance information;
determining a future time period during which the requested content file will be available on a cache server;
constructing an indication of a time-based link directed to a location in said cache server at which the content file is retrievable at the future time period and within the client delay tolerance, wherein the configuration of the link renders the link inactive until the future time period; and
delivering to the client the indication of the time-based link.

2. The method according to claim 1, wherein the indication of the time-based link is delivered to the client in a predetermined format, said predetermined format comprising one of: (a) a uniform resource locator, (b) a common gateway script and (c) an active X program.

3. The method of claim 2, further comprising identifying information regarding the cache server on which the content will be available during the time period, said identifying being performed by said uniform resource locator.

4. The method of claim 1, wherein the client processes the indication of the time-based link and requests the content file from the cache server during the time period of availability.

5. The method of claim 1, further comprising:
storing the content files in a host computer server, the host computer server further performing one of the following steps in response to the received request for a content file: (a) delivering the content file to the client, (b) redirecting the client to a cache server which has a copy of the requested content file, and (c) generating and sending to the requesting client a uniform resource locator, wherein the uniform resource locator includes at least one of: (a) explicit time period availability information, and (b) a link to a file that includes time period availability information.

6. The method of claim 1, further comprising:
storing the content file in a content server, wherein the request for the content file is received by the content server; and
identifying, at the content server, the cache server where the requested content file will be available and the time period during which the content file will be available from the identified cache server.

7. The method of claim 2 wherein the request for a content file is received by a content server and forwarded to the cache server or other content server.

8. The method according to claim 2, wherein said step of determining is performed by the cache server, said cache server generating the uniform resource locator corresponding to the determined future time period of availability.

9. The method of claim 2, further comprising:
forwarding the request for a content file received by a content server to a content delivery network broker, wherein the content delivery network broker performs said step of determining; and
generating the uniform resource locator by one of the content delivery network broker and the content server for sending to the client.

10. The method of claim 1, wherein the request for a content file from the client further includes information as to a desired delivery time or desired delivery time period.

11. The method of claim 2, wherein the received request from the client includes information as to a desired delivery time or desired delivery time period, said content server generating and returning to the client the uniform resource locator which includes a time and points to a server which will have the requested content file during the desired delivery time.

12. The method of claim 1, wherein the received request from the client includes a request that the content file be delivered as soon as it is available, the content server determining the time when the content file will be available and pointing to a server which will have the requested content file at a time of content availability.

13. The method of claim 2, wherein the uniform resource locator comprises a link to a file having time period availability information and an XML tag also having the time period availability information so that an XML parser can read the XML tag and enable or disable the link during the appropriate time periods.

14. The method of claim 2, wherein the uniform resource locator comprises a link to a content server or a cache server, said link explicitly containing the time period of availability of the content.

15. The method of claim 2, further comprising programming the client to process the time-based information in the uniform resource locator and to request transfer of the content file during the time period of availability.

16. The method of claim 2, further comprising programming the client to process the indication of the time-based link and cache server information in the uniform resource locator to request transfer of the content file during the available time period.

17. The method of claim 2, wherein the requested content file is available on a content server and can be distributed to at least one cache server within a content delivery network, said content delivery network scheduling a distribution of content files to cache servers in the content delivery network, and returning the uniform resource locator to the content server which redirects the uniform resource locator to the client.

18. The method of claim 2, further comprising distributing the requested content file when available on a content server to one or more cache servers within a content delivery network said content delivery network scheduling a distribution of content files to cache servers in the content delivery network when available on the cache server, wherein if the requested content file is not available on the cache server in the content delivery network that is close to the client when requested, said content delivery network scheduling a distribution of the content file to the cache server during the determined future time period and returns the uniform resource locator to the content server having the determined time period information and the cache server identity.

19. A system for delivering content files to a client comprising:
a content delivery network having a content server and at least one cache server;
means for receiving a request for a content file from the client that includes client delay tolerance information;
means for determining a future time period during which the content file will be available on the at least one cache server;
means for constructing an indication of a time-based link directed to a location in the at least one cache server at which the content file is retrievable at the future time period and within the client content delay tolerance, wherein the configuration of the link renders the link inactive until the future time period;
means for delivering to the client the indication of the time-based link;
wherein said receiving means, said determining means, said constructing means and said delivering means comprise at least one of said content server and said at least one cache server.

20. The system for delivering content files according to claim 19, further comprising a content delivery network broker connected to the content server and said at least one cache server, said network broker providing availability information of the requested content file to the at least one cache server.

21. The system for delivering content files according to claim 19, wherein the time-based information is delivered to the client in a predetermined format, said predetermined format comprising one of: (a) a uniform resource locator, (b) a common gateway script and (c) an active X program.

22. The system for delivering content files according to claim 19, further comprising a content delivery network broker connected to the content server and said at least one cache server, said network broker providing availability information of the requested content file to the at least one cache server, and scheduling the future availability of the requested content file.

23. A method for delivering content files comprising:
receiving a request for a content file from a client, said request including desired delivery time or desired delivery time period information input by the client;
determining a future time period during which the requested content file will be available on a cache server;
constructing an indication of a time-based link directed to a location in said cache server at which the content file is retrievable at the future time period and within the client content delay tolerance, wherein the configuration of the link renders the link inactive until the future time period;
delivering to the client the indication of the time-based link.

24. The method of claim 23 further comprising:
storing the content files in a host computer server, the host computer server further performing one of the following steps in response to the received request for a content file: (a) delivering the content file to the client, (b) redirecting the client to a cache server which has a copy of the requested content file, and (c) generating and sending to the requesting client a uniform resource locator, wherein the uniform resource locator includes at least one of: (a) explicit time period availability information, and (b) a link to a file containing time period availability information.

25. The method of claim 23, further comprising:
storing the content file in a content server, wherein the request for the content file is received by the content server; and
identifying, at the content server, the cache server where the requested content file will be available and the time period during which the content file will be available from the identified cache server.

* * * * *